G. Thompson.
Rod Coupling.

Nº 87,223.  Patented Feb. 23, 1869.

Witnesses,
Wm. A. Morgan.
Ph. C. Dieterich.

Inventor,
G. Thompson
per Munn & Co.
Attorneys

G. THOMPSON, OF SHAMBURG, PENNSYLVANIA, ASSIGNOR TO HIMSELF AND M. C. GEIDER, OF SAME PLACE.

Letters Patent No. 87,223, dated February 23, 1869.

IMPROVEMENT IN ROD-COUPLING.

The Schedule referred to in these Letters Patent and making part of the same.

*To all whom it may concern:*

Be it known that I, G. THOMPSON, of Shamburg, in the county of Venango, and State of Pennsylvania, have invented a new and improved Rod-Coupling; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
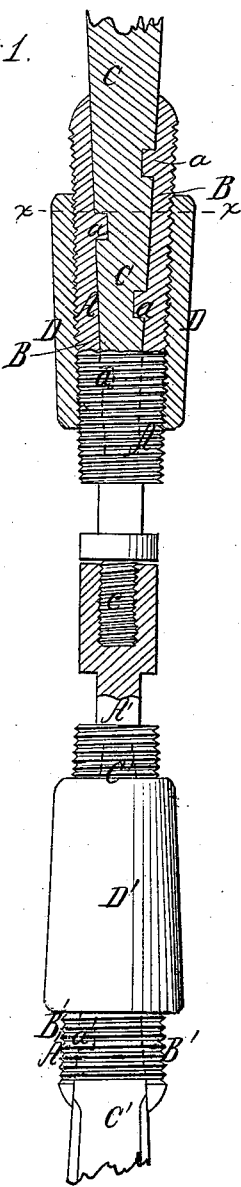
Figure 1 represents a side view, partly in section, of my improved rod-coupling.
Figure 2:
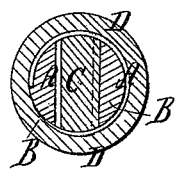
Figure 2 is a horizontal section of the same, taken on the plane of the line $x\ x$, fig. 1.

The object of this invention is to produce a device for connecting two rods, which are used as pump-rods in oil-wells, in salt-works, or for any other suitable purpose.

The invention consists in the use of two clamps, in which the ends of the rods are respectively held, the clamps being provided with male and female-screw threads, or equivalent means, to enable their being connected. Each clamp is constructed by cutting a wedge-shaped long recess into the broad end of a somewhat conical metallic block, and in forming lugs on the sides of such recess. The end of the rod is shaped tapering, and grooved to fit into said recess, and to receive said lugs, and is thus firmly held.

The two jaws thus formed by the recess are forcibly pressed against the interposed end of the rod, by means of a sleeve screwed around them. The nearer this sleeve is brought to the thick end of the clamp, the more will it compress the wood; and should the wood shrink, it will only be necessary to screw up the sleeve a little more to the thicker end.

A, in the drawing, represents a metal bar, which is at one end split, so as to form two jaws B B.

The outside of the body of the bar A is made somewhat conical, that is, thicker at its split end. A screw-thread is formed around it.

The slot cut into the bar A is wedge-shaped, and on its sides are formed projecting lugs $a\ a$, of suitable shape.

C is the end of the wooden rod, which is to be connected with another rod.

The end of C is wedge-shaped, and has grooves, all corresponding to the form of slot, and to the lugs $a$ in A, so that the end of the rod can be interposed between the jaws B B, as shown in fig. 1.

D is a sleeve, or elongated nut, screwed upon the bar A, so as to clamp the parts B and C together. It can be adjusted up and down at will, to securely hold the rod, or to allow the removal of the same.

A' is another bar, having jaws B', and a sleeve, D', to hold a rod, C', in the manner above described. The two rods are thus fastened in their respective holders A A', and are connected by screwing the said holders A A' together, in the manner shown in fig. 1, for which purpose a screw-projection, $c$, is formed on A, and a corresponding socket on A'. The parts A A' may, however, be fastened together by any other suitable means.

Having thus described my invention,

What I claim as new, and desire to secure by Letters Patent, is—

The slotted clamp A, made in conical form, and provided with the external screw-thread, and the conical sleeve D, provided with the female screw, as herein described, for the purpose specified.

G. THOMPSON.

Witnesses:
G. H. HART,
J. SALISBURY.